(12) United States Patent
Hong et al.

(10) Patent No.: US 8,998,208 B1
(45) Date of Patent: Apr. 7, 2015

(54) TRANSMISSION DEVICE OF AUTOMATIC DOCUMENT FEEDER

(71) Applicant: Foxlink Image Technology Co., Ltd., New Taipei (TW)

(72) Inventors: I Chuan Hong, New Taipei (TW); Lung Chen, New Taipei (TW); Wen Ching Liao, New Taipei (TW); Tsung Ching Chou, New Taipei (TW); Ting Yu Lu, New Taipei (TW); Jing Hua Fang, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 8 days.

(21) Appl. No.: 14/088,753

(22) Filed: Nov. 25, 2013

(51) Int. Cl.
*B65H 3/06* (2006.01)
*B65G 13/06* (2006.01)
*F16H 1/20* (2006.01)

(52) U.S. Cl.
CPC ... *B65G 13/06* (2013.01); *F16H 1/20* (2013.01); *B65H 2403/422* (2013.01); *B65H 2403/942* (2013.01); *B65H 2403/421* (2013.01); *B65H 3/0669* (2013.01); *B65H 3/0684* (2013.01)

(58) Field of Classification Search
CPC ............ B65H 3/0669; B65H 3/0684; B65H 2403/422; B65H 2403/421; B65H 2403/942
See application file for complete search history.

(56) References Cited

U.S. PATENT DOCUMENTS

| | | | | |
|---|---|---|---|---|
| 6,942,215 | B2* | 9/2005 | Kang et al. | 271/265.01 |
| 6,962,332 | B2* | 11/2005 | Su | 271/4.01 |
| 7,540,485 | B2* | 6/2009 | Su et al. | 271/10.05 |
| 7,934,717 | B2* | 5/2011 | Takeda et al. | 271/4.04 |
| 8,328,179 | B2* | 12/2012 | Shimomura et al. | 271/4.04 |
| 8,336,871 | B2* | 12/2012 | Liao et al. | 271/10.04 |
| 8,544,840 | B2* | 10/2013 | Ng et al. | 271/186 |
| 2014/0260739 | A1* | 9/2014 | Hong et al. | 74/354 |

* cited by examiner

*Primary Examiner* — Luis A Gonzalez
(74) *Attorney, Agent, or Firm* — Muncy, Geissler, Olds & Lowe, P.C.

(57) ABSTRACT

A transmission device of automatic document feeder includes a transmission gear assembly, a pickup transmission gear assembly, a paper-feed transmission gear assembly, a correction transmission gear assembly, a pressure transmission gear assembly and a turn-over transmission gear assembly. The transmission gear assembly includes a transmission roller, a first drive gear and a second drive gear. The pickup transmission gear assembly includes a pickup drive gear, a pickup swing arm and a pickup auxiliary swing arm. The paper-feed transmission gear assembly driven by the transmission gear assembly includes a paper-feed reverse gear and a paper-feed swing arm. And the correction transmission gear assembly and the paper-feed transmission gear assembly rotate towards the same direction. The pressure transmission gear assembly includes a pressure swing arm and a pressure actuating gear. The turn-over transmission gear assembly is driven by the first drive gear of the transmission gear assembly.

10 Claims, 12 Drawing Sheets

TRANSMISSION DEVICE OF AUTOMATIC DOCUMENT FEEDER

BACKGROUND OF THE INVENTION

1. Field of the Invention

The present invention generally relates to a transmission device, and more particularly to a transmission device of automatic document feeder.

2. The Related Art

Referring to FIG. 1, a traditional transmission device of automatic document feeder (not labeled) is adapted for being assembled in an automatic document feeder 100'. The automatic document feeder 100' generally includes a passageway 10' for transmitting papers. The passageway 10' includes an input tray 14', a paper-curved space 19', a paper-feed channel 13', a scanning channel 17', a paper-out channel 15' and a paper-out tray 16' which are disposed in sequence from upstream to downstream, and a turn-over channel 18' connected between the paper-feed channel 13' and the paper-out channel 15'.

In order to make the paper transmitted through the above-mentioned passageway 10', the automatic document feeder 100' disposes a plurality of transmission devices along the passageway 10'. For example, the automatic document feeder 100' includes a pickup device 20' disposed at an entry end of the paper-feed channel 13', a plurality of paper-feed roller 11', and a correction roller 22' disposed along the paper-feed channel 13' and the paper-out channel 15', and a paper-out device 40' disposed at an exit end of the paper-out channel 15'. The paper-out device 40' includes a paper-out roller 41' and a pressure roller 42' movably disposed under the paper-out roller 41'.

When the paper is scanned, the pickup device 20' of the automatic document feeder 100' will rotate clockwise to press downward on the papers which are placed in the input tray 14' to start feeding the papers into the paper-feed channel 13' of the automatic document feeder 100', but at the time of the paper being fed into the paper-feed channel 13', the correction roller 22' and the paper-feed roller 11' rotate anticlockwise or stop rotating, so the paper is curved in the paper-curved space 19' to make the paper unable to be further fed into the paper-feed channel 13', at the moment, a front edge of the paper is in alignment with the correction roller 22'. Then the correction roller 22' and the paper-feed roller 11' rotate clockwise, the paper is able to be further fed into the paper-feed channel 13'. At the moment, the pickup device 20' stops rotating for avoiding feeding the paper again.

After the paper is transmitted to the paper-feed channel 13', the paper-feed roller 11' disposed between the paper-feed channel 13' and the paper-out channel 15' regularly rotates towards one direction, so as to transmit the paper to the scanning channel 17'. The automatic document feeder 100' further includes a scanning unit (not shown), the scanning unit scans the paper. After completing scanning the paper, the pressure roller 42' still presses against the paper-out roller 41' to transmit the scanned paper to the paper-out tray 16'.

In general, when the automatic document feeder 100' proceeds one-sided scanning, the pressure roller 42' keeps pressing against the paper-out roller 41' and further exerts a positive force on the paper. But when the automatic document feeder 100' proceeds two-sided three-path scanning, at the time of the paper completing the one-sided scanning and being going to depart from the paper-out channel 15', the paper-out device 40' rotates anticlockwise and transmits the paper to the turn-over channel 18' reversely. The paper passing through the turn-over channel 18' is turned over and is further return to the paper-feed channel 13'. After turning over the paper, in order to avoid front and rear edges of the paper staggered at the position of the paper-out device 40' to be clamped by the pressure roller 42' to jam the paper, the pressure roller 42' will descend to separate from the paper-out roller 41'.

From the above-mentioned description, it is able to be known that the pickup device 20', no matter in action time point and the rotation direction, the paper-feed roller 11' and the paper-out device 40' have largish differences, the paper-feed roller 11' rotates towards the same direction, the correction roller 22', the paper-feed roller 11', the pickup device 20' and the paper-out device 40' need to change rotation directions according to different positions of the paper, and the paper-out roller 41' and the pressure roller 42' of the paper-out device 40' must be opened in a proper time. So the automatic document feeder 100' mostly needs three motors or at least two motors, use clutches or use magnetic valves and so on to respectively drive the pickup device 20', the correction roller 22', the paper-feed roller 11' and the paper-out device 40'.

However, the automatic document feeder 100' mostly needs three motors or at least two motors that increases a volume of the automatic document feeder 100' and a manufacturing cost of the automatic document feeder 100'.

In order to solve the problem described above, it is essential to improve the traditional transmission device of automatic document feeder, and the automatic document feeder 100'.

SUMMARY OF THE INVENTION

An object of the present invention is to provide a transmission device of automatic document feeder adapted for being assembled in an automatic document feeder. The automatic document feeder includes a pickup device, a correction device, a paper-feed device, a paper-out device, a turn-over device and a motor. The transmission device of automatic document feeder is for transmitting transmission torques of the motor. The transmission device of automatic document feeder includes a transmission gear assembly, a pickup transmission gear assembly, a paper-feed transmission gear assembly, a correction transmission gear assembly, a pressure transmission gear assembly and a turn-over transmission gear assembly. The transmission gear assembly is connected with and is driven by the motor. The transmission gear assembly includes a transmission roller connecting with the motor, a first drive gear and a second drive gear respectively driven by the transmission roller. The pickup transmission gear assembly includes a pickup drive gear, a pickup swing arm coaxially pivoted with the pickup drive gear, and a pickup auxiliary swing arm coaxially pivoted with the first drive gear of the transmission gear assembly. The pickup swing arm swings between a first position and a second position with the rotation of the pickup drive gear, and the pickup auxiliary swing arm swings between a third position and a fourth position with the rotation of the first drive gear of the transmission gear assembly. When the motor rotates clockwise to make the pickup swing arm to swing to the first position, the pickup transmission gear assembly contacts the pickup device and transmits a first transmission torque to the pickup device, at the moment, the pickup auxiliary swing arm swings to the fourth position, the pressure transmission gear assembly contacts the paper-out device and transmits a second transmission torque to the paper-out device. When the motor rotates anticlockwise to make the pickup swing arm to swing to the second position, the pickup transmission gear assembly contacts the paper-out device and transmits a third transmission torque to the paper-out device, at the moment, the pickup auxiliary swing arm swings to the third position, the pickup transmission gear assembly contacts the pickup device and transmits a fourth transmission torque to the pickup device. The paper-feed transmission gear assembly is driven by the transmission gear assembly, and the transmission gear assembly rotates towards different directions to drive the paper-feed device to rotate or stop rotating. The paper-feed transmission gear assembly includes a paper-feed reverse gear engaging with the transmission roller of the transmission gear assembly, and a paper-feed swing arm coaxially fastened to the paper-feed reverse gear. The paper-feed swing arm swings between a fifth position and a sixth position with the rotation of the paper-feed reverse gear of the paper-feed transmission gear assembly. When the motor rotates anticlockwise to make the paper-feed swing arm swing to the fifth position, the paper-feed transmission gear assembly engages with the paper-feed device and transmits a fifth transmission torque to the paper-feed device, when the motor rotates clockwise to make the paper-feed swing arm swing to the sixth position, the paper-feed device rotating anticlockwise to stop feeding the paper. The correction transmission gear assembly is driven by the paper-feed transmission gear assembly. And the correction transmission gear assembly and the paper-feed transmission gear assembly rotate towards the same direction. The pressure transmission gear assembly includes a pressure swing arm coaxially fastened with the first drive gear of the transmission gear assembly, and a pressure actuating gear pivoted to the pressure swing arm. The pressure swing arm swings between a seventh position and an eighth position with the rotation of the transmission roller of the transmission gear assembly, when the pressure swing arm swings to the seventh position, the pressure actuating gear of the pressure transmission gear assembly breaks away from the paper-out device, when the pressure swing arm swings to the eighth position, the pressure actuating gear of the pressure transmission gear assembly engages with the paper-out device, and transmits a sixth transmission torque to the paper-out device. The turn-over transmission gear assembly is driven by the first drive gear of the transmission gear assembly, no matter towards which direction the first drive gear of the transmission gear assembly rotates, the transmission gear assembly is able to transmit the transmission torque with the same direction to the turn-over device. When the pickup swing arm swings towards the first position, the pickup auxiliary swing arm swings towards the fourth position, the paper-feed swing arm swings towards the sixth position, the pressure swing arm swings towards the eighth position, when the pickup swing arm swings towards the second position, the pickup auxiliary swing arm swings towards the third position, the paper-feed swing arm swings towards the fifth position, and the pressure swing arm swings towards the seventh position.

As described above, the transmission device of automatic document feeder disposed with a plurality of swing arms and cam gears, it utilizes different swing arms to generate a swing interaction in a condition of the drive gears rotating in different directions to transmit the transmission torque to the pickup device, the correction device, the paper-feed device, the paper-out device and the turn-over device in turn, and also utilizes a time difference between the swing arms swinging back and forth to control an output time of the transmission torque. Furthermore, it utilizes a characteristic of the cam gear rotating to the missing tooth portion to stop rotating to realize a switch action of the paper-out pressure roller. So it only needs to use the motor without being assembled with an extra controller, and it is able to effectively decrease a volume of the automatic document feeder and lower a manufacturing cost of the automatic document feeder.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
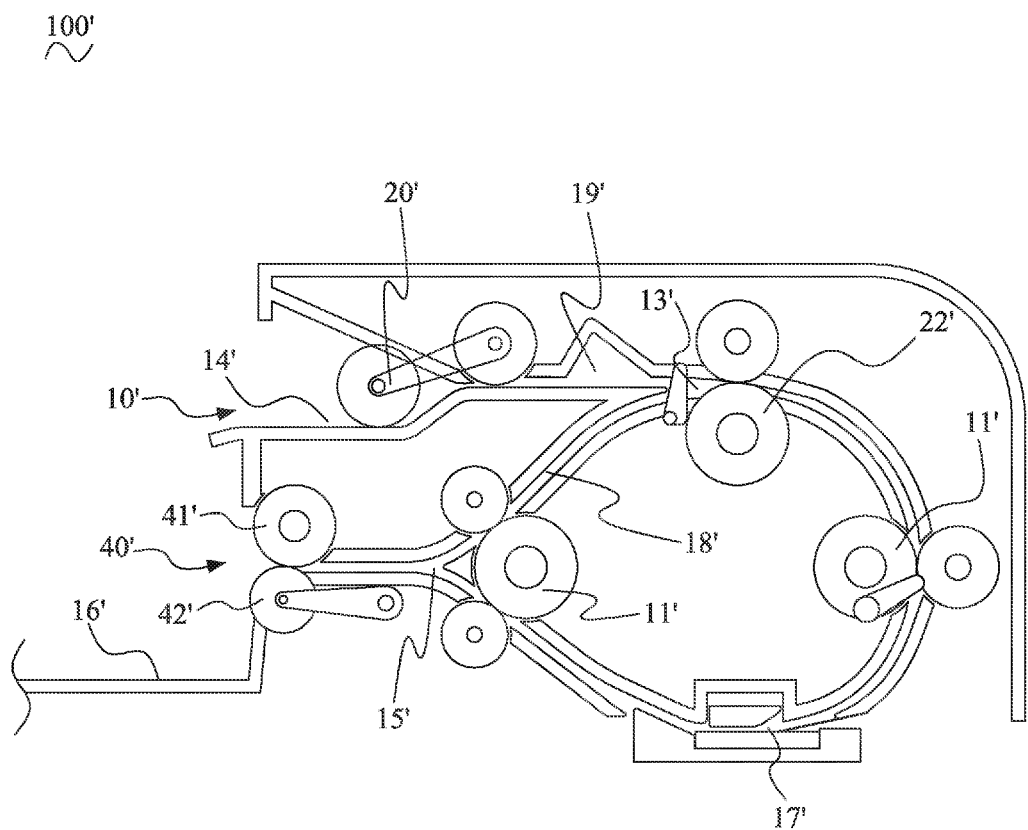
FIG. 1 is a schematic diagram of an automatic document feeder in prior art.

With reference to FIG. 2, FIG. 3, FIG. 4, FIG. 5, FIG. 6 and FIG. 18, a transmission device of automatic document feeder 100 having a paper skew correction function in accordance with an embodiment of the present invention is shown. The transmission device of automatic document feeder 100 is adapted for being assembled in an automatic document feeder 200 so as to proceed one-sided scanning and two-sided three-path scanning. The transmission device of automatic document feeder 100 is used for transmitting transmission torques of the motor 90. The automatic document feeder 200 includes a passageway 80 for feeding papers (not shown). The passageway 80 includes an input tray 81, a feed channel 82, a scanning channel 83, a paper-out channel 84 and a paper-out tray 85 which are disposed in sequence from upstream to downstream, and a turn-over channel 86 disposed between the feed channel 82 and the paper-out channel 84. The automatic document feeder 200 further includes a pickup device 10, a correction device 20, a paper-feed device 30, a paper-out device 40, a turn-over device 50 disposed between the pickup device 10 and the paper-out device 40, and a motor 90 for driving the pickup device 10, the correction device 20, the paper-feed device 30, the paper-out device 40 and the turn-over device 50. In this embodiment, the transmission torques include a first, second, third, fourth, fifth, sixth or seventh transmission torque.

Figure 2:
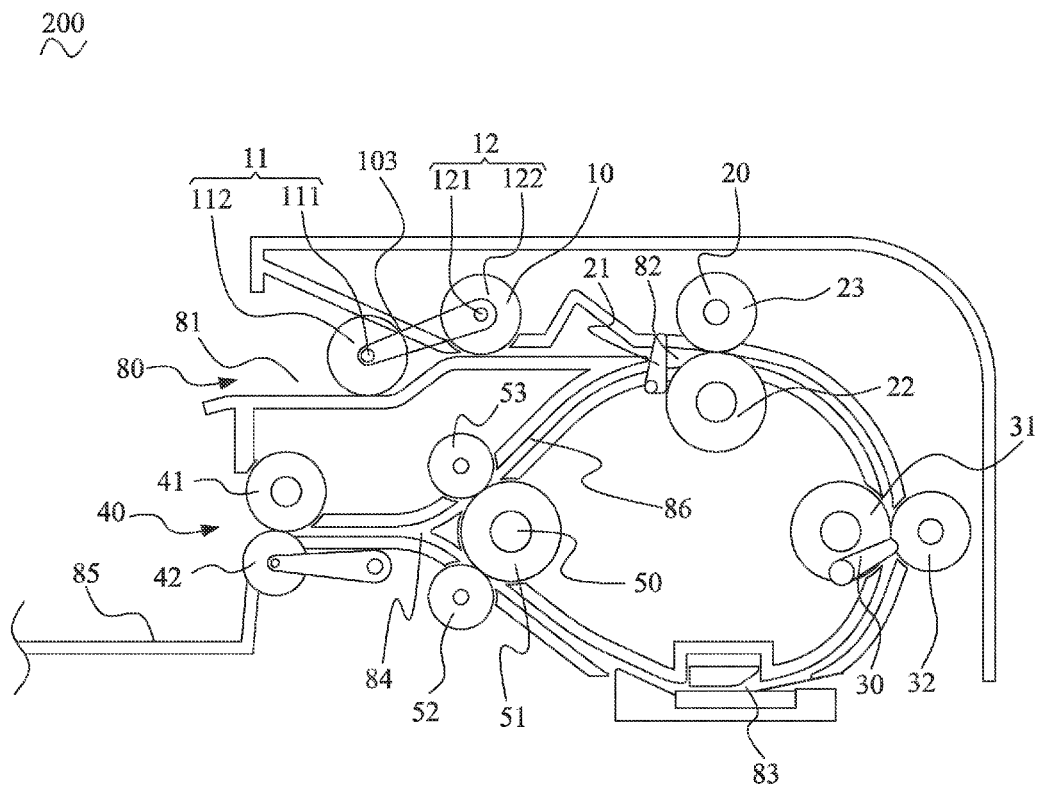
FIG. 2 is a schematic diagram of an automatic document feeder in accordance with an embodiment of the present invention.

Referring to FIG. 2, the pickup device 10 disposed between the input tray 81 and the feed channel 82 includes a pickup element 11, a separation element 12 and a first transmitting element 101 linking the pickup element 11 and the separation element 12. The pickup element 11 for picking up the papers includes a pickup shaft 111 and a pickup roller 112 mounted around the pickup shaft 111. The separation roller 12 for separating the papers picked up by the pickup roller 111 so as to ensure the papers to be transmitted to the feed channel 82 piece by piece and further bringing along each piece of the paper to be transmitted downstream. The separation element 12 includes a separation shaft 121 and a separation roller 122 mounted around the separation shaft 121. The separation roller 121 is disposed with one one-way bearing (not labeled) so as to ensure the separation roller 121 to rotate towards the same direction.

Referring to FIG. 2, the correction device 20 includes a correcting sensor 21, a correction roller 22 and a correction pressure roller 23.

Referring to FIG. 2, the paper-feed device 30 includes a paper-feed roller 31 and a paper-feed pressure roller 32.

Referring to FIG. 2, the paper-out device 40 disposed between the paper-out channel 84 and the paper-out tray 85 includes a paper-out roller 41 and a paper-out pressure roller 42.

Referring to FIG. 2, the turn-over device 50 includes a turn-over roller 51, a paper-transmitting pressure roller 52 and a turn-over pressure roller 53. The turn-over roller 51 is disposed at an intersection of the scanning channel 83, the paper-out channel 84 and the turn-over channel 86. The paper-transmitting pressure roller 52 is disposed at an extreme of the scanning channel 83 and suppresses the turn-over roller 51. The turn-over pressure roller 53 is disposed at an initiating terminal of the turn-over channel 86 and suppresses the turn-over roller 51.

Figure 3:
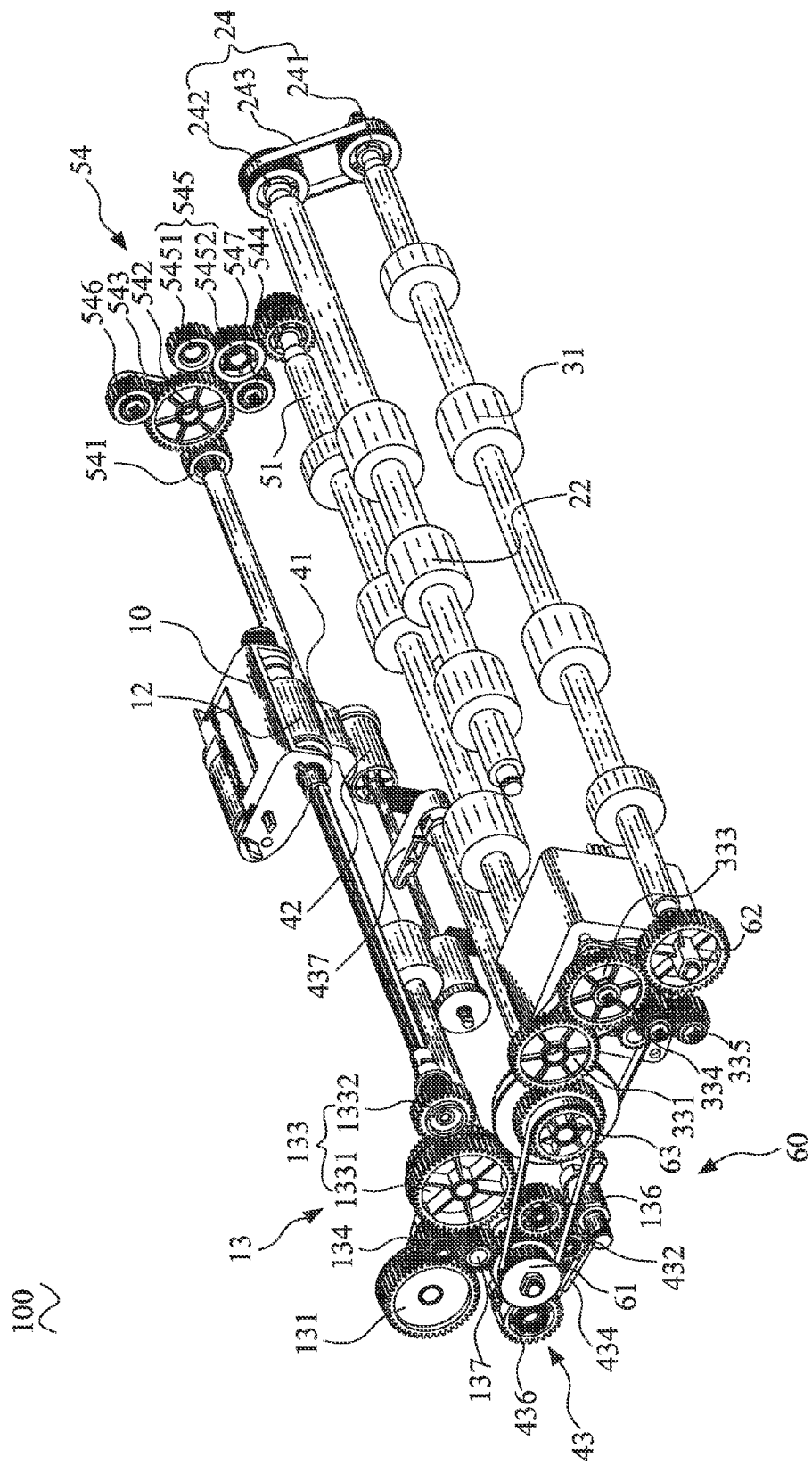
FIG. 3 is a perspective view of a transmission device of automatic document feeder of FIG. 1.
Figure 5:
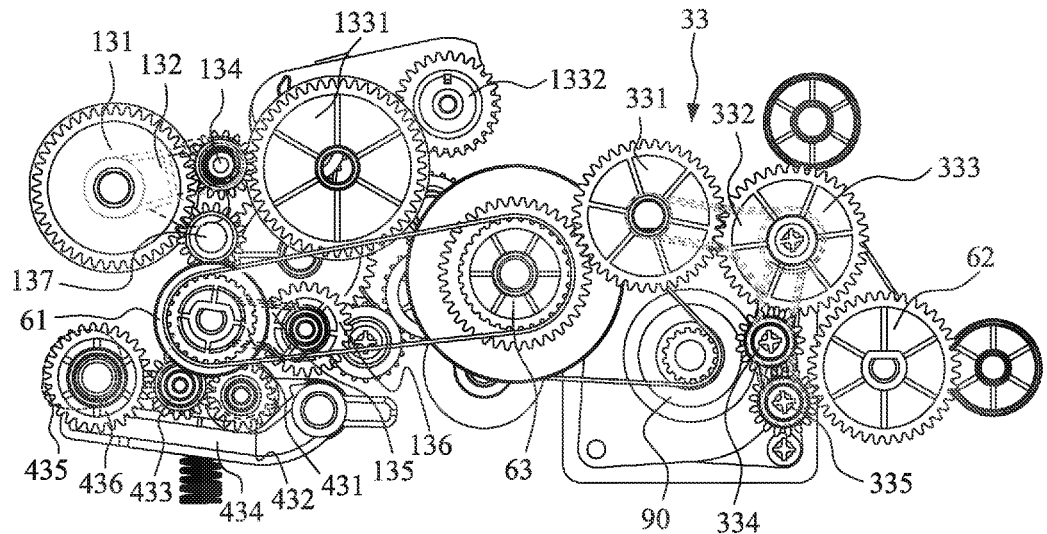
FIG. 5 is a perspective view of the transmission device of automatic document feeder of FIG. 1, wherein a swing arm of the transmission device swings to a position.
Figure 6:
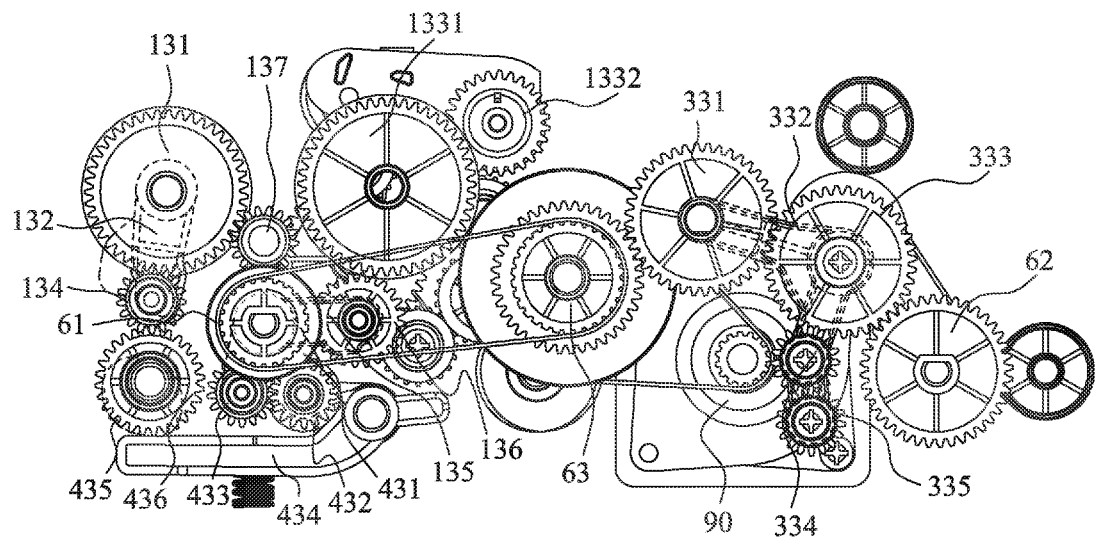
FIG. 6 is a perspective view of the transmission device of automatic document feeder of FIG. 1, wherein the swing arm of the transmission device swings to another position.
Figure 7:
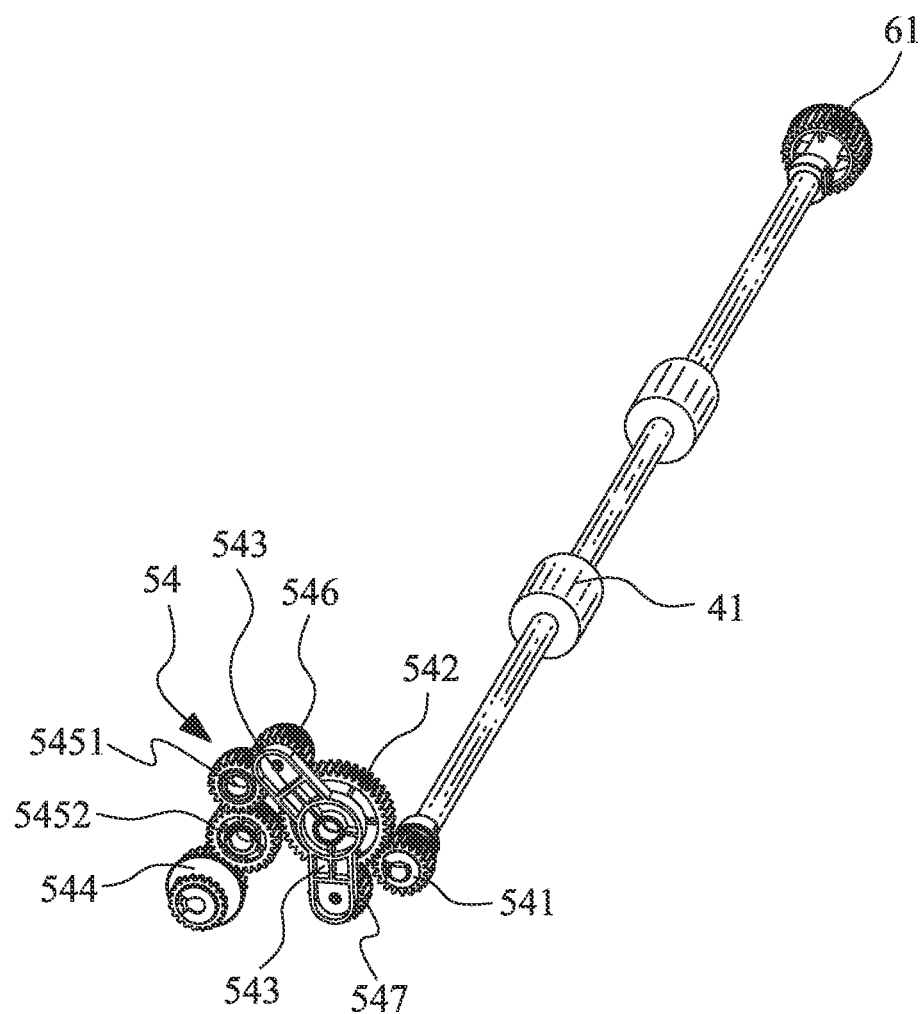
FIG. 7 is a perspective view of a turn-over transmission gear assembly of the transmission device of automatic document feeder of FIG. 1.
Figure 8:
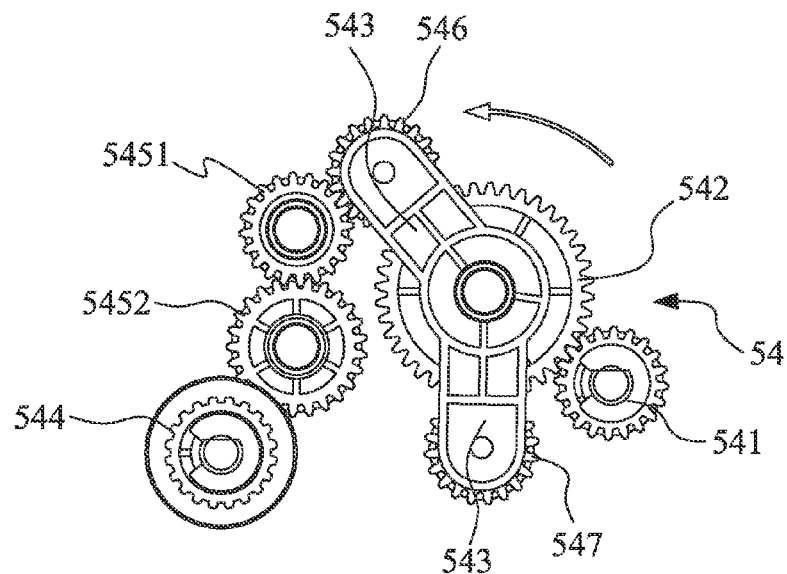
FIG. 8 is a perspective view of the transmission device of automatic document feeder of FIG. 1, wherein a turn-over swing arm swings to a position.
Figure 9:
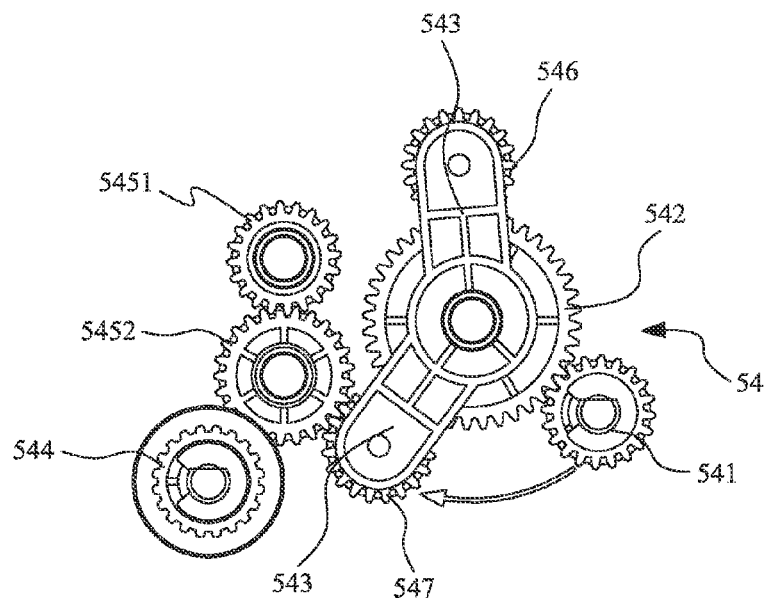
FIG. 9 is another perspective view of the transmission device of automatic document feeder of FIG. 1, wherein the turn-over swing arm swings to another position.

Referring to FIG. 3, FIG. 5 and FIG. 6, the transmission device of automatic document feeder 100 includes a transmission gear assembly 60 connected with and driven by the motor 90, a pickup transmission gear assembly 13 driven by the transmission gear assembly 60, a correction transmission gear assembly 24, a paper-feed transmission gear assembly 33, a pressure transmission gear assembly 43 and a turn-over transmission gear assembly 54.

Referring to FIG. 3, FIG. 4, FIG. 5 and FIG. 6, the transmission gear assembly 60 includes a transmission roller 63 connecting with the motor 90, a first drive gear 61 and a second drive gear 62 respectively driven by the transmission roller 63, and the second drive gear 62 transmits a driving force to the paper-feed transmission gear assembly 33. The transmission roller 63, the first drive gear 61 and the motor 90 rotate towards the same direction. The first drive gear 61 and the paper-out roller 41 are coaxially assembled together. The second drive gear 62 and the paper-feed roller 31 are coaxially assembled together.

Referring to FIG. 3, FIG. 5 and FIG. 6, the pickup transmission gear assembly 13 includes a pickup drive gear 131, a pickup swing arm 132 coaxially pivoted with the pickup drive gear 131, a pickup reverse gear assembly 133, a pickup actuating gear 134 movably engaging with or separating from the pickup drive gear 131 and the pickup reverse gear assembly 133 and coaxially pivoted with the pickup swing arm 132 by a torque limiter, a pickup auxiliary swing arm 135 coaxially pivoted with the first drive gear 61 of the transmission gear assembly 60, a pickup auxiliary actuating gear 136 movably engaging with or separating from the pickup reverse gear assembly 133 and coaxially pivoted with the pickup auxiliary swing arm 135 by the torque limiter, and a reverse gear 137 engaging with the first drive gear 61 and the pickup drive gear 131. The pickup drive gear 131 and the first drive gear 61 are able to rotate towards the same direction by virtue of the reverse gear 137. The pickup reverse gear assembly 133 includes a pickup reverse gear 1331 engaging with the pickup actuating gear 134, and a pickup reverse drive gear 1332 engaging with the pickup reverse gear 1331 and coaxially connecting with separation roller 12. When the first drive gear 61 of the transmission gear assembly 60 rotates, it will bring along the pickup drive gear 131 to rotate, the pickup swing arm 132 swings between a first position (shown in FIG. 5) and a second position (shown in FIG. 6) with the rotation of the pickup drive gear 131, and the pickup auxiliary swing arm 135 swings between a third position (shown in FIG. 6) and a fourth position (shown in FIG. 5) with the rotation of the first drive gear 61 of the transmission gear assembly 60.

Referring to FIG. 2, FIG. 3, FIG. 4, FIG. 5, FIG. 6 and FIG. 7, when the motor 90 rotates clockwise to make the pickup swing arm 132 to swing to the first position (shown in FIG. 5), the pickup drive gear 131 rotates clockwise to drive the pickup reverse gear assembly 133 and the pickup actuating gear 134 to rotate so as to make the pickup transmission gear assembly 13 contact the pickup device 10 and transmit the first transmission torque to the pickup device 10 to pick up the papers by virtue of the pickup actuating gear 134 engaging with the pickup drive gear 131 and the pickup reverse gear assembly 133, at the moment, the pickup auxiliary swing arm 135 swings to the fourth position (shown in FIG. 5), the pressure transmission gear assembly 43 contacts the paper-out device 40 and transmits the second transmission torque to the paper-out device 40 so as to make the paper-out pressure roller 42 away from the paper-out roller 41 for discharging the papers out of the passageway 80 successfully. When the motor 90 rotates anticlockwise to make the pickup swing arm 132 to swing to the second position (shown in FIG. 6), the pickup transmission gear assembly 13 contacts the paper-out device 40 and transmits the third transmission torque to the paper-out device 40 so as to make the paper-out pressure roller 42 press against the paper-out roller 41, at the moment, the pickup auxiliary swing arm 135 swings to the third position (shown in FIG. 6), the pickup transmission gear assembly 13 contacts the pickup device 10 and transmits the fourth transmission torque to the pickup device 10 by virtue of the pickup auxiliary actuating gear 136 engaging with the pickup reverse gear assembly 133 to raise up the pickup device 10 to return to an original position to stop picking up the papers.

Referring to FIG. 3, FIG. 5 and FIG. 6, the correction transmission gear assembly 24 is driven by the paper-feed transmission gear assembly 33, and the correction transmission gear assembly 24 and the paper-feed transmission gear assembly 33 rotate towards the same direction. The correction transmission gear assembly 24 includes a correction transmission gear 241 coaxially driven by the second drive gear 62 and coaxially assembled with the paper-feed roller 31, a correction drive device 242, and a second transmitting element 243 linking the correction transmission gear 241 and the correction drive device 242. The correction drive device 242 is driven by the correction transmission gear 241 on account of the a second transmitting element 243 linking the correction transmission gear 241 and the correction drive device 242, and the correction drive device 242 and the correction transmission gear 241 rotate towards the same direction, and the correction drive device 242 coaxially assembled with the correction roller 22.

Referring to FIG. 2, FIG. 3, FIG. 5 and FIG. 6, the paper-feed transmission gear assembly 33 is driven by the transmission gear assembly 60. The transmission gear assembly 60 rotates towards different directions to drive the paper-feed device 30 to rotate or stop rotating. Specifically, the paper-feed transmission gear assembly 33 includes a paper-feed reverse gear 331 engaging with the transmission roller 63 of the transmission gear assembly 60, a paper-feed swing arm 332 coaxially fastened to the paper-feed reverse gear 331, a first paper-feed actuating gear 333 movably engaging with or separating from the second drive gear 62 and pivoted to the paper-feed swing arm 332 by the torque limiter, a paper-feed reverse actuating gear 334 and a second paper-feed actuating gear 335. When the transmission roller 63 rotates, it will bring along the paper-feed reverse gear 331 of the paper-feed transmission gear assembly 33 to rotate, the paper-feed swing arm 332 swings between a fifth position (shown in FIG. 6) and a sixth position (shown in FIG. 5) with the rotation of the paper-feed reverse gear 331 of the paper-feed transmission gear assembly 33. When the motor 90 rotates anticlockwise to make the paper-feed swing arm 332 swing to the fifth position (shown in FIG. 6), the transmission roller 63 drives the paper-feed reverse gear 331 to drive the first paper-feed actuating gear 333 engage with the second drive gear 62. The paper-feed roller 31 rotates to bring along the paper downstream so as to make the paper-feed transmission gear assembly 33 engage with the paper-feed device 30 and transmit the fifth transmission torque to the paper-feed device 30 by virtue of the second drive gear 62 and the paper-feed roller 31 being coaxially assembled with each other. The paper-feed roller 31 and the correction roller 22 rotate clockwise to feed the paper.

Referring to FIG. 2, FIG. 3, FIG. 5 and FIG. 6, when the motor 90 rotates clockwise to make the paper-feed swing arm 332 swing to the sixth position (shown in FIG. 5), the transmission roller 63 drives the paper-feed reverse gear 331 to drive the second paper-feed actuating gear 335 engage with the second drive gear 62 to make the second drive gear 62 be unable to rotate, so that the paper-feed roller 31 of the paper-feed device 30 rotates anticlockwise to stop feeding the paper. Specifically, when the motor 90 rotates clockwise, the transmission roller 63 rotates clockwise, the paper-feed reverse gear 331 rotates anticlockwise to drive the paper-feed swing arm 332 to rotate anticlockwise, and the first paper-feed actuating gear 333 breaks away from the second drive gear 62 and the second paper-feed actuating gear 335 contacts the second drive gear 62. The second drive gear 62 rotates anticlockwise and the paper-feed roller 31 rotates anticlockwise. And then the correction transmission gear assembly 24 drives the correction roller 22 to rotate anticlockwise. If the second paper-feed actuating gear 335 is disassembled, the paper-feed roller 31 and the correction roller 22 stop rotating. Regardless of the correction roller 22 rotating anticlockwise or stopping rotating, the correction roller 22 has the paper skew correction function as well. When the motor 90 rotates anticlockwise, the transmission roller 63 rotates anticlockwise, the paper-feed reverse gear 331 rotates clockwise to drive the paper-feed swing arm 332 rotate clockwise, the second paper-feed actuating gear 335 breaks away from the second drive gear 62, the first paper-feed actuating gear 333 rotates anticlockwise to engage with the second drive gear 62, so that the paper-feed roller 31 rotates clockwise to feed the papers, the paper-feed roller 31 drives the correction transmission gear 241 and the correction drive device 242 to rotate clockwise to feed the papers.

Referring to FIG. 3, FIG. 4, FIG. 5 and FIG. 6, the pressure transmission gear assembly 43 includes a pressure swing arm 431 coaxially fastened with the first drive gear 61 of the transmission gear assembly 60, a pressure reverse gear 432 pivoted to the pressure swing arm 431 and engaging with the first drive gear 61, a pressure actuating gear 433 pivoted to the pressure swing arm 431 and engaging with the pressure reverse gear 432, a pressure transmission actuating arm 434 disposed facing to the paper-out roller 41, a cam 435 disposed to one side of the pressure transmission actuating arm 434, a cam gear 436 coaxially pivoted with the cam 435 and a pressure lever 437 controlled by the pressure transmission actuating arm 434. The pressure swing arm 431 swings between a seventh position (shown in FIG. 6) and an eighth position (shown in FIG. 5) with the rotation of the transmission roller 63 of the transmission gear assembly 60. When the pressure swing arm 431 swings to the seventh position (shown in FIG. 6), the pressure actuating gear 433 of the pressure transmission gear assembly 43 breaks away from the cam gear 436 so as to break away from the paper-out device 40, the paper-out pressure roller 42 is close to the paper-out roller 41. When the pressure swing arm 431 swings to the eighth position (shown in FIG. 5), the pressure actuating gear 433 of the pressure transmission gear assembly 43 engages with the cam gear 436 and the paper-out device 40, and transmits the sixth transmission torque to the paper-out device 40 so that the paper-out pressure roller 42 breaks away from the paper-out roller 41. Specifically, when the cam gear 436 rotates, it will bring along the cam 435 to rotate, and further exerts force on the pressure transmission actuating arm 434, the cam gear 436 defines a missing tooth portion 4361, when the pickup actuating gear 134 and the pressure actuating gear 433 drive the cam gear 436 to rotate, the cam gear 436 will stop rotating at the position of missing tooth portion 4361.

Figure 4:
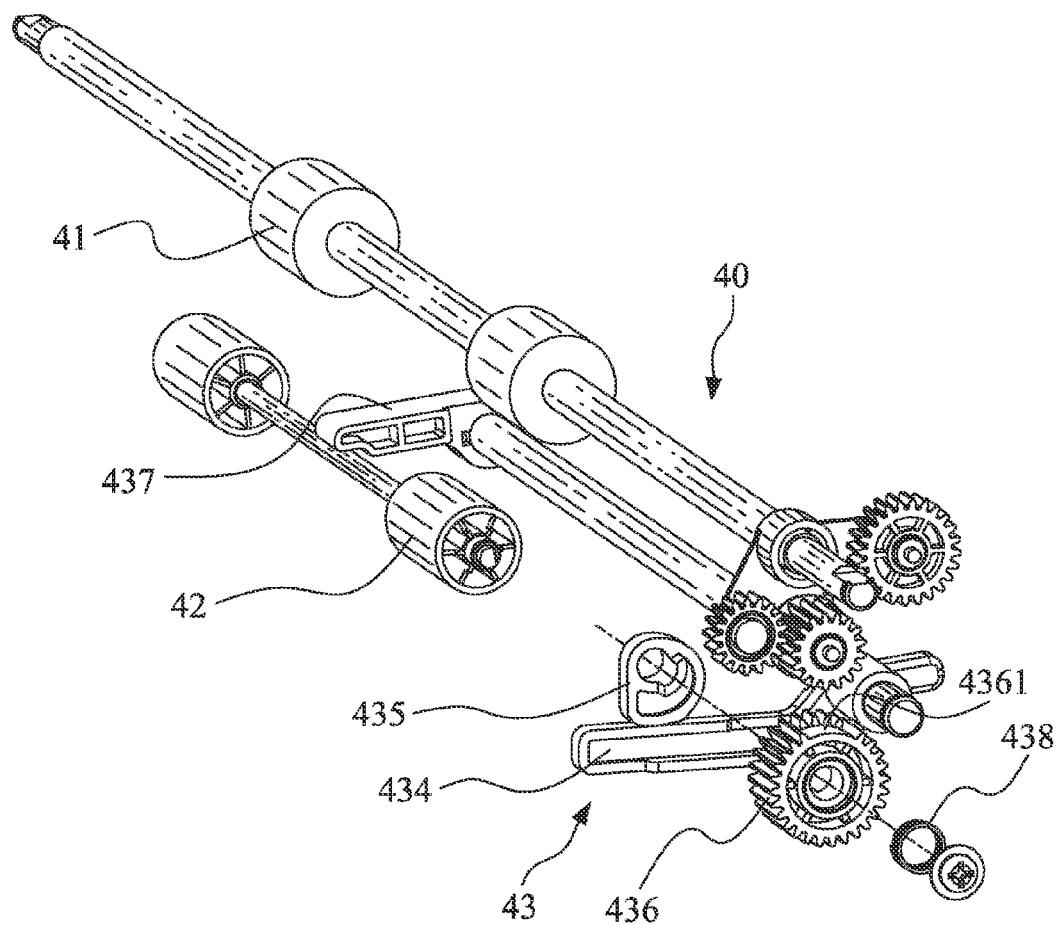
FIG. 4 is a perspective view of a paper-out device of the transmission device of automatic document feeder of FIG. 1.

Referring to FIG. 3, FIG. 4 and FIG. 5, so, when the motor 90 rotates clockwise, the pickup auxiliary swing arm 135 swings to the fourth position (shown in FIG. 5), the pressure actuating gear 433 will engage with the cam gear 436 to rotate anticlockwise, at the same time, the cam gear 436 will take the cam 435 to rotate ninety degrees and push the pressure transmission actuating arm 434 to be raised up to drive the pressure lever 437 to be raised up so as to make the paper-out pressure roller 42 close to the paper-out roller 41, until the cam 435 rotates to the missing tooth portion 4361, at the same time, the pressure actuating gear 433 keeps rotating, but it's unable to continue rotating the cam gear 436, but the paper-out pressure roller 42 has completely pressed against the paper-out roller 41.

Referring to FIG. 4 and FIG. 6, on the contrary, when the motor 90 rotates anticlockwise, the pickup auxiliary swing arm 135 swings to the second position (shown in FIG. 6), the pickup actuating gear 134 will engage with the cam gear 436 to rotate clockwise, at the same time, the cam gear 436 will drive the cam 435 to rotate two hundred and seventy degrees and push the pressure transmission actuating arm 434 to be pressed downward to drive the pressure lever 437 to be pressed downward so as to make the paper-out pressure roller 42 break away from the paper-out roller 41 until the pressure transmission actuating arm 434 rotates to the missing tooth portion 4361, at the same time, the pickup actuating gear 134 keeps rotating, but it's unable to continue rotating the cam gear 436, but the paper-out pressure roller 42 has completely broken apart away from paper-out roller 41.

Referring to FIG. 4, the cam gear 436 is coaxially disposed with a resistance spring 438. The resistance spring 438 exerts a resistance on the cam gear 436 to ensure the cam gear 436 to stop rotating until the cam gear 436 rotates to the position of the missing tooth portion 4361.

Referring to FIG. 2, FIG. 3, FIG. 7, FIG. 8 and FIG. 9, the turn-over transmission gear assembly 54 is driven by the first drive gear 61 of the transmission gear assembly 60. No matter towards which direction the first drive gear 61 of the transmission gear assembly 60 rotates, the transmission gear assembly 60 is able to transmit the transmission torque with the same direction to the turn-over device 50 by the turn-over transmission gear assembly 54. The turn-over transmission gear assembly 54 includes a turn-over transmission gear 541 coaxially connected with the first drive gear 61, a turn-over drive gear 542 engaging with the turn-over transmission gear 541, a turn-over swing arm 543 coaxially pivoted with the turn-over drive gear 542 and having two free ends, a turn-over output roller 544 coaxially connected with the turn-over roller 51, a turn-over reverse gear assembly 545 engaging with the turn-over output roller 544, a first turn-over actuating gear 546 and a second turn-over actuating gear 547 respectively pivoted to the two free ends of the turn-over swing arm 543 by the torque limiter. The turn-over reverse gear assembly 545 includes a first turn-over reverse gear 5451 engaging with the turn-over output roller 544, and a second turn-over reverse gear 5452 engaging with the first turn-over reverse gear 5451. The turn-over swing arm 543 swings between a ninth position (shown in FIG. 8) and a tenth position (shown in FIG. 9) according to a rotation direction of the turn-over drive gear 542. When the turn-over swing arm 543 swings to the ninth position (shown in FIG. 8), the turn-over drive gear 542 drives the first turn-over actuating gear 546 to engage with the first turn-over reverse gear 5451 so as to bring along the second turn-over actuating gear 547 and the turn-over output roller 544 and transmits the seventh transmission torque to the turn-over roller 51. So, no matter towards which direction the transmission gear assembly 60 rotates, the transmission gear assembly 60 is able to transmit the transmission torque with the same direction to the turn-over device 50 to make a rotation direction of the turn-over roller 51 keep consistent. The rotation direction of the turn-over roller 51 keeps rotating clockwise.

Referring to FIG. 3, FIG. 4, FIG. 5, FIG. 6, FIG. 8 and FIG. 9, the transmission device of automatic document feeder 100 in accordance with the present invention is disposed with a plurality of swing arms which include the pickup swing arm 132, the pickup auxiliary swing arm 135, the paper-feed swing arm 332, the pressure swing arm 431 and the turn-over swing arm 543. When the pickup swing arm 132 swings towards the first position (shown in FIG. 5), the pickup auxiliary swing arm 135 swings towards the fourth position (shown in FIG. 5), the paper-feed swing arm 332 swings towards the sixth position (shown in FIG. 5), the pressure swing arm 431 swings towards the eighth position (shown in FIG. 5), the turn-over swing arm 543 swings towards the tenth position (shown in FIG. 9). When the pickup swing arm 132 swings towards the second position (shown in FIG. 6), the pickup auxiliary swing arm 135 swings towards the third position (shown in FIG. 6), the paper-feed swing arm 332 swings towards the fifth position (shown in FIG. 6), the pressure swing arm 431 swings towards the seventh position (shown in FIG. 6), and the turn-over swing arm 543 swings towards the ninth position (shown in FIG. 8).

Referring to FIG. 2, FIG. 3, FIG. 4, FIG. 5, FIG. 6, FIG. 7, FIG. 8, FIG. 9, FIG. 10 and FIG. 11, in this embodiment, the torque limiters are designated as compression springs 70. The compression spring 70 is assembled to swing arm which is designated as the pickup swing arm 132, the pickup auxiliary swing arm 135, the paper-feed swing arm 332, the pressure swing arm 431 or the turn-over swing arm 543 and make two opposite ends of the compression spring 70 respectively abut against the swing arm and an actuating gear which is designated as the pickup actuating gear 134 of the pickup transmission gear assembly 13, the pickup auxiliary actuating gear 136 the pickup transmission gear assembly 13, the first paper-feed actuating gear 333 of the paper-feed transmission gear assembly 33, the second paper-feed actuating gear 335 of the paper-feed transmission gear assembly 33, the pressure actuating gear 433, the first turn-over actuating gear 546 and the second turn-over actuating gear 547 so as to increase a positive force and a friction force between the swing arm and the actuating gear.

Figure 10:
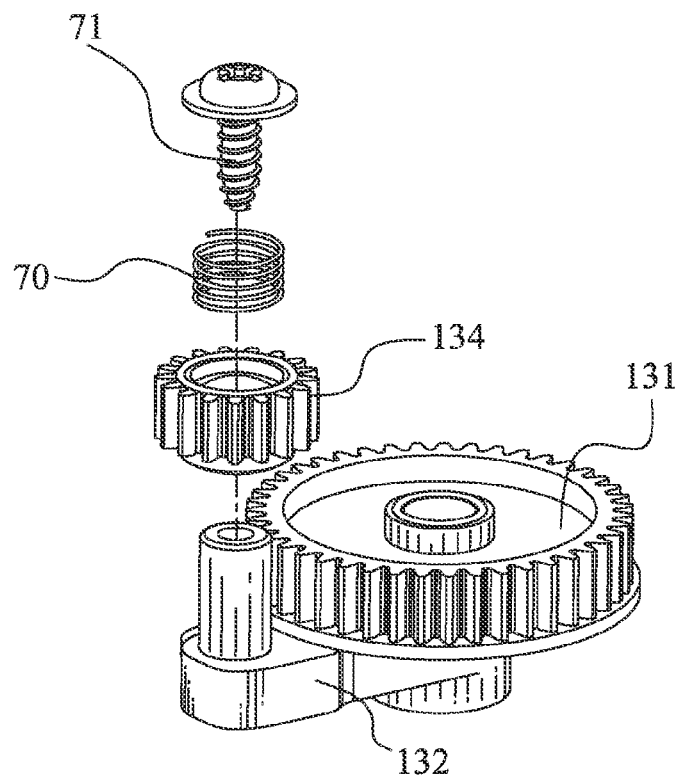
FIG. 10 is a perspective view of a torque limiter of the transmission device of automatic document feeder of FIG. 1.
Figure 11:
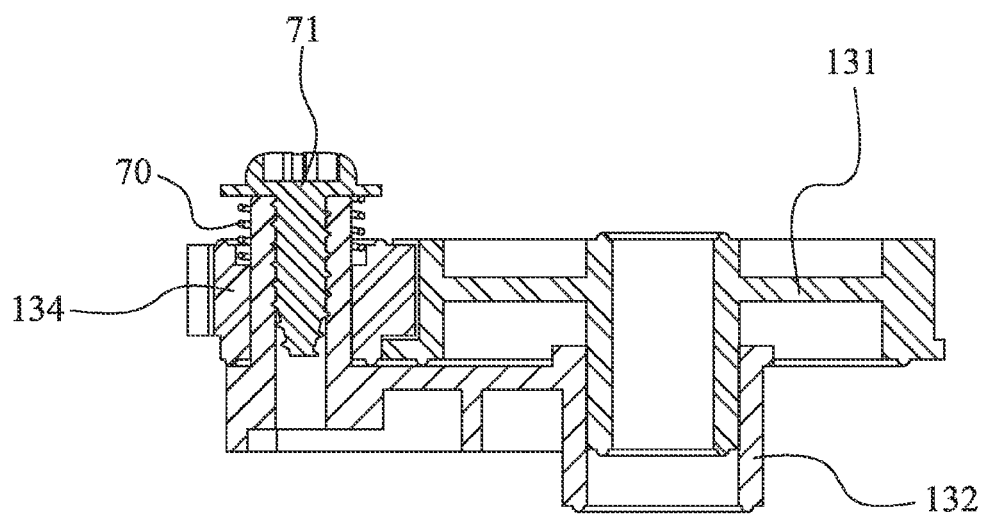
FIG. 11 is a sectional view of the torque limiter of the transmission device of automatic document feeder of FIG. 10.
Figure 12:
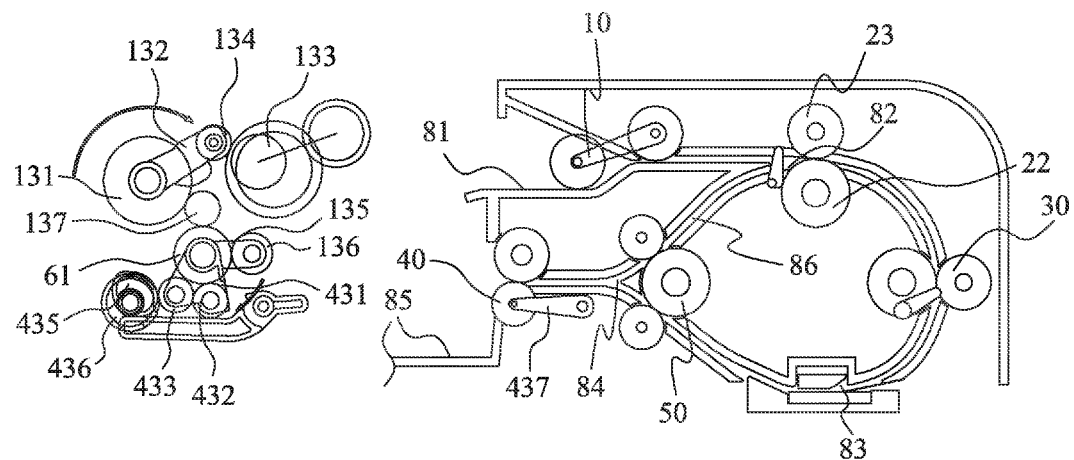
FIG. 12 is a schematic diagram showing a first action status of the automatic document feeder of FIG. 1.
Figure 13:
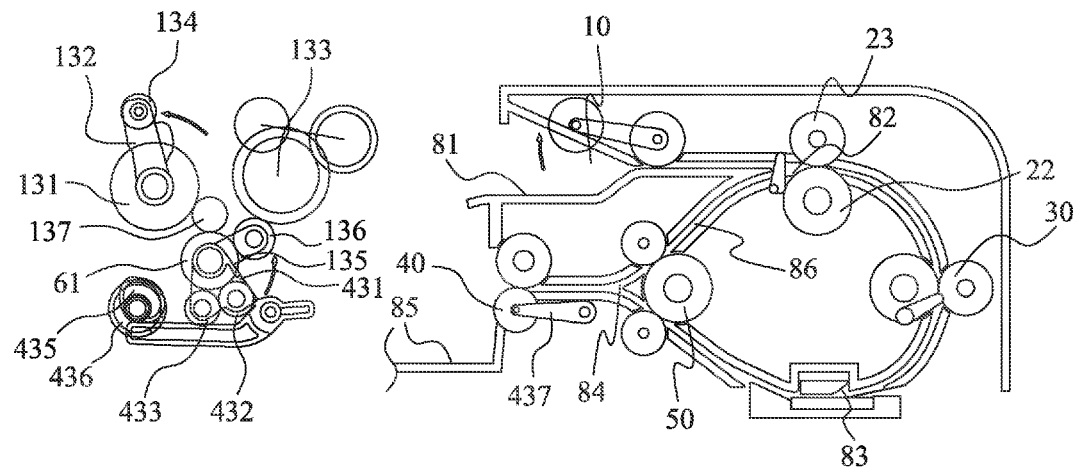
FIG. 13 is a schematic diagram showing a second action status of the automatic document feeder of FIG. 1.
Figure 14:
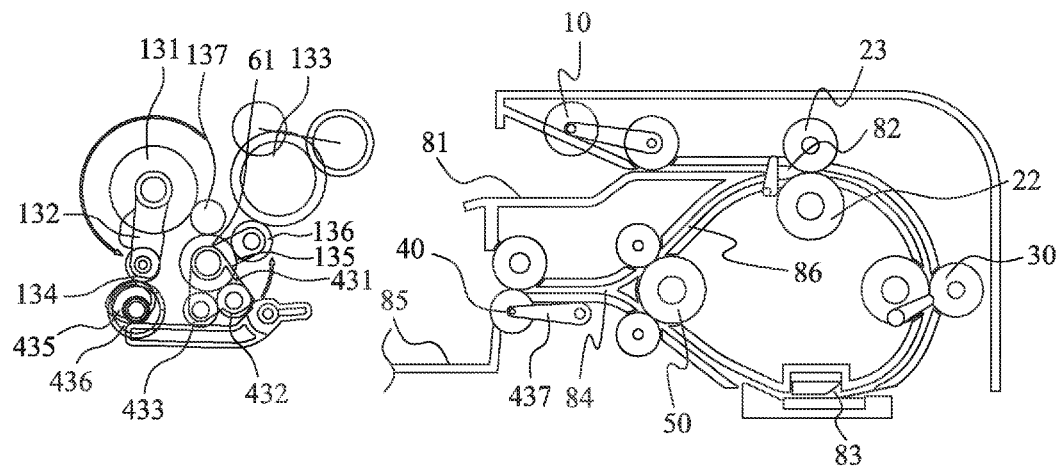
FIG. 14 is a schematic diagram showing a third action status of the automatic document feeder of FIG. 1.
Figure 15:
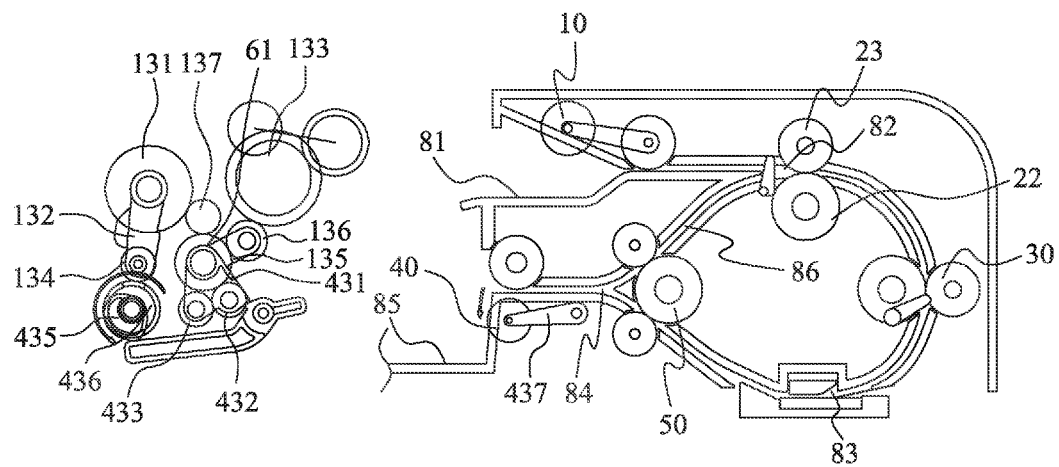
FIG. 15 is a schematic diagram showing a fourth action status of the automatic document feeder of FIG. 1.
Figure 16:
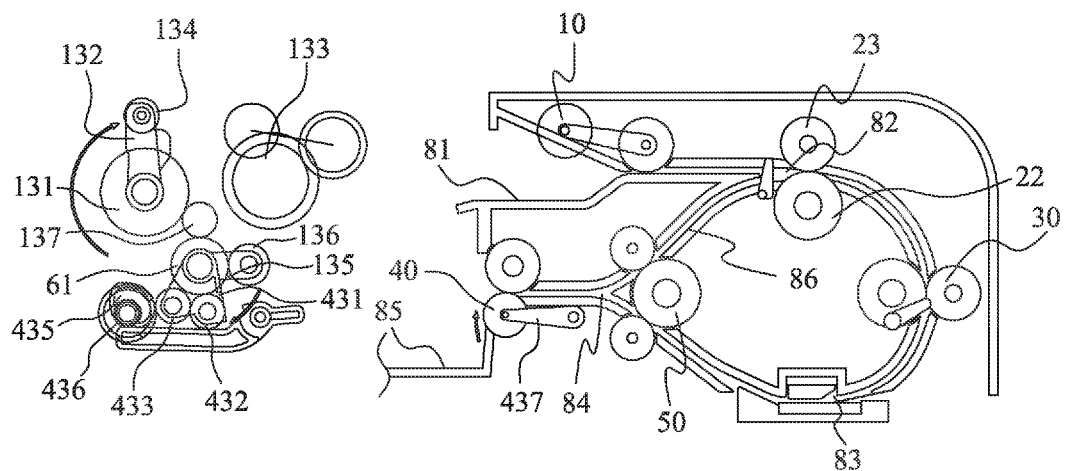
FIG. 16 is a schematic diagram showing a fifth action status of the automatic document feeder of FIG. 1.
Figure 17:
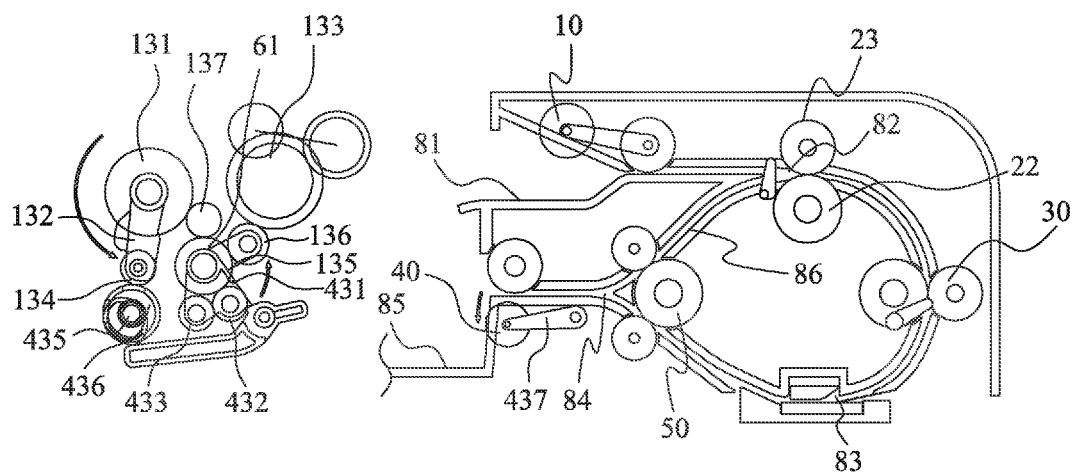
FIG. 17 is a schematic diagram showing a sixth action status of the automatic document feeder of FIG. 1.
Figure 18:
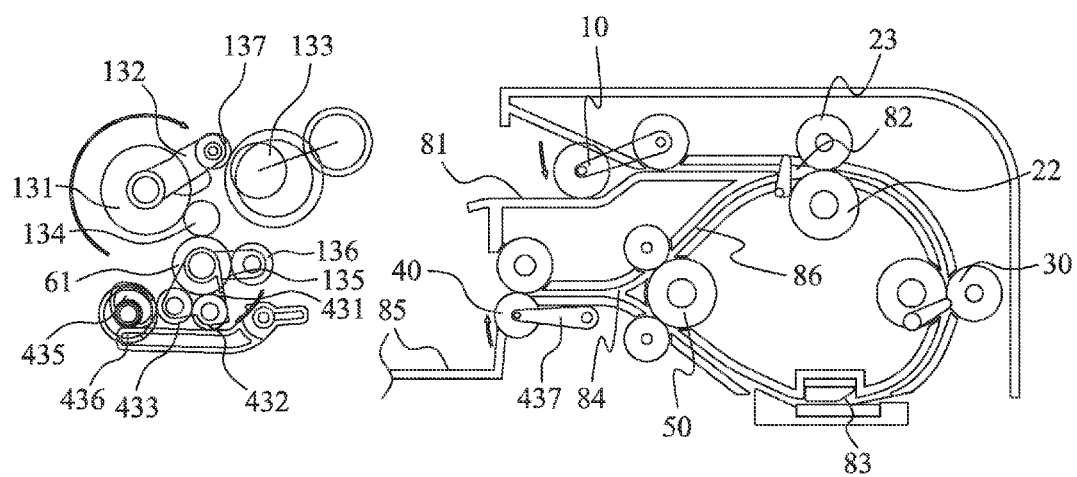
FIG. 18 is a schematic diagram showing a seventh action status of the automatic document feeder of FIG. 1.

Referring to FIG. 10 and FIG. 11, take the torque limiter between the pickup swing arm 132 and the pickup actuating gear 134 for example, the pickup actuating gear 134 and the compression spring 70 is coaxially pivoted to a free end of the pickup swing arm 132, and the compression spring 70 is fastened to the pickup actuating gear 134 by a screw 71 so as to exert a positive force on the pickup actuating gear 134. So when a transmission torque exerted between the pickup swing arm 132 and the pickup actuating gear 134 is less than a friction resistance, the pickup swing arm 132 and the pickup actuating gear 134 will not generate a relative rotation, until the transmission torque exceeds a largest static friction force between the pickup swing arm 132 and the pickup actuating gear 134, the pickup swing arm 132 and the pickup actuating gear 134 will generate a relative rotation.

Referring to FIG. 2 to FIG. 16, an action process of the transmission device of automatic document feeder 100 and the automatic document feeder 200 proceeding one-sided scanning is described as follows.

Referring to FIG. 2, FIG. 3, FIG. 4, FIG. 5, FIG. 12, FIG. 13, FIG. 14, FIG. 15 and FIG. 16, when the automatic document feeder 200 starts scanning, the papers are located in the input tray 81. The motor 90 rotates clockwise to make the first drive gear 61 and the pickup drive gear 131 rotate clockwise so as to bring along the pickup swing arm 132 to rotate clockwise to the first position (shown in FIG. 5), the pickup actuating gear 134 contacts and engages with the pickup reverse gear assembly 133, and the first transmission torque is transmitted to the pickup device 10. At the same time, the separation roller 12 rotates anticlockwise so as to drive the pickup device 10 to press downward on the input tray 81, and then transmits the papers to the feed channel 82. Simultaneously, the motor 90 drives the transmission roller 63 to rotate clockwise so as to drive the paper-feed reverse gear 331 to rotate anticlockwise and transmit the fifth transmission torque to the paper-feed transmission gear assembly 33, supposing the paper-feed reverse actuating gear 334 and the second paper-feed actuating gear 335 to be assembled correctly, the paper-feed reverse actuating gear 334 and the second paper-feed actuating gear 335 drive the second drive gear 62 to rotate anticlockwise, and the paper-feed roller 31 and the correction roller 22 rotate anticlockwise. On the contrary, supposing the paper-feed reverse actuating gear 334 and the second paper-feed actuating gear 335 to be disassembled, the paper-feed roller 31 and the correction roller 22 stop rotating. Regardless of the correction roller 22 rotating anticlockwise or stopping rotating clockwise, when the paper is transmitted to the correction roller 22 and touches the correcting sensor 21, because the correction pressure roller 23 presses on the correction roller 22 tightly to make the correction roller 22 stop rotating or rotate anticlockwise, the paper will be curved on account of the paper being obstructed, so a front edge of the paper is able to be corrected and is in alignment with the correction roller 22. The correcting sensor 21 sends an information to the motor 90, the motor 90 rotates anticlockwise.

The motor 90 rotates anticlockwise, the motor 90 rotates anticlockwise to make the first drive gear 61 and the pickup drive gear 131 rotate anticlockwise so as to drive the pickup swing arm 132 and the pickup auxiliary swing arm 135 to rotate anticlockwise for making the pickup actuating gear 134 depart from the first position (shown in FIG. 5) and further break away from the pickup reverse gear assembly 133, the pickup auxiliary actuating gear 136 rotates anticlockwise together with the pickup auxiliary swing arm 135 and the pickup auxiliary actuating gear 136 haven't contacted the pickup reverse gear assembly 133, so that the first transmission torque is able to be transmitted to the pickup device 10. The separation roller 12 is unable to rotate by virtue of the one-way bearing, at the same time, the motor 90 drives the paper-feed reverse gear 331 to rotate clockwise to transmit the fifth transmission torque to the paper-feed transmission gear assembly 33, so that the second drive gear 62 rotates clockwise, the paper-feed roller 31 and the correction roller 22 synchronously rotates clockwise and transmits the papers forward. And the turn-over transmission gear assembly 54 driven by the first drive gear 61 transmits the seventh transmission torque to the turn-over roller 51 to make the turn-over roller 51 to rotate clockwise for making the paper pass through the scanning channel 83 and further transmit to the paper-out channel 84.

Referring to FIG. 2, FIG. 3, FIG. 4, FIG. 6, FIG. 16 and FIG. 17, after feeding the paper into the passageway 80 for a while, the first drive gear 61 drives the pressure swing arm 431 to rotate anticlockwise, so that the pressure actuating gear 433 breaks away from the cam gear 436. The pickup drive gear 131 rotates anticlockwise to drive the pickup swing arm 132 to rotate anticlockwise, the pickup actuating gear 134 rotates to engage with the cam gear 436 so as to drive the cam gear 436 to rotate anticlockwise until the cam gear 436 rotates to the missing tooth portion 4361 facing to the pickup drive gear 131, at the moment, the cam gear 436 stops rotating. The cam 435 presses downward on the pressure transmission actuating arm 434, the pressure transmission actuating arm 434 presses downward on the pressure lever 437, the paper-out pressure roller 42 breaks away from the paper-out roller 41 for ensuring the paper which pass through the scanning channel 83 partially transmitted out of the paper-out channel 84. Then when the paper is completed being scanned, the motor 90 rotates clockwise, the first drive gear 61 drives the pressure swing arm 431 to rotate anticlockwise to make the pressure actuating gear 433 engage with the cam gear 436 to rotate anticlockwise, the cam gear 436 will bring along the cam 435 to rotate, and push the pressure transmission actuating arm 434 to be raised up so as to drive the pressure lever 437 to be raised up for making the paper-out pressure roller 42 close to the paper-out roller 41, the first drive gear 61 brings along the paper-out roller 41 to rotate clockwise so as to transmit the paper out of the paper-out channel 84 to complete the one-sided scanning. The motor 90 continues rotating clockwise, and brings along the next paper into the passageway 80.

Referring to FIG. 2 to FIG. 18, an action process of the transmission device of automatic document feeder 100 and the automatic document feeder 200 proceeding two-sided three-path scanning is described as follows.

Referring to FIG. 2, FIG. 3, FIG. 4, FIG. 5, FIG. 12, FIG. 13, FIG. 14, FIG. 15 and FIG. 16, when the automatic document feeder 200 starts scanning, the papers are located in the input tray 81. The motor 90 rotates clockwise to make the first drive gear 61 and the pickup drive gear 131 rotate clockwise so as to bring along the pickup swing arm 132 to rotate clockwise to the first position (shown in FIG. 5), the pickup actuating gear 134 engage with the pickup reverse gear assembly 133, so that the first transmission torque is transmitted to the pickup device 10. At the same time, the separation roller 12 rotates anticlockwise so as to drive the pickup device 10 to press downward on the input tray 81, and then transmits the papers to the feed channel 82. Simultaneously, the motor 90 drives the transmission roller 63 to rotate clockwise so as to drive the paper-feed reverse gear 331 to rotate anticlockwise and transmit the fifth transmission torque to the paper-feed transmission gear assembly 33, supposing the paper-feed reverse actuating gear 334 and the second paper-feed actuating gear 335 to be assembled correctly, the paper-feed reverse actuating gear 334 and the second paper-feed actuating gear 335 drive the second drive gear 62 to rotate anticlockwise, and the paper-feed roller 31 and the correction roller 22 rotate anticlockwise. On the contrary, supposing the paper-feed reverse actuating gear 334 and the second paper-feed actuating gear 335 to be disassembled, the paper-feed roller 31 and the correction roller 22 stop rotating. Regardless of the correction roller 22 rotating anticlockwise or stopping rotating clockwise, when the paper is transmitted to the correction roller 22 and touches the correcting sensor 21, because the correction pressure roller 23 presses on the correction roller 22 tightly to make the correction roller 22 stop rotating or rotate anticlockwise, the paper will be curved on account of the paper being obstructed, so the front edge of the paper is able to be corrected and is in alignment with the correction roller 22. The correcting sensor 21 sends an information to the motor 90, the motor 90 rotates anticlockwise.

The motor 90 rotates anticlockwise, the motor 90 rotates anticlockwise to make the first drive gear 61 and the pickup drive gear 131 rotate anticlockwise so as to drive the pickup swing arm 132 and the pickup auxiliary swing arm 135 to rotate anticlockwise for making the pickup actuating gear 134 depart from the first position (shown in FIG. 5) and further breaks away from the pickup reverse gear assembly 133, the pickup auxiliary actuating gear 136 rotates anticlockwise together with the pickup auxiliary swing arm 135 and the pickup auxiliary actuating gear 136 haven't contacted the pickup reverse gear assembly 133, so that the first transmission torque is able to be transmitted to the pickup device 10. The separation roller 12 is unable to rotate by virtue of the one-way bearing, at the same time, the motor 90 drives the paper-feed reverse gear 331 to rotate clockwise to transmit the fifth transmission torque to the paper-feed transmission gear assembly 33, so that the second drive gear 62 rotates clockwise, the paper-feed roller 31 and the correction roller 22 synchronously rotates clockwise and transmits the papers forward. And the turn-over transmission gear assembly 54 driven by the first drive gear 61 transmits the seventh transmission torque to the turn-over roller 51 to make the turn-over roller 51 to rotate clockwise for making the paper pass through the scanning channel 83 and further transmit to the paper-out channel 84.

Referring to FIG. 2, FIG. 3, FIG. 4, FIG. 5, FIG. 6, FIG. 16 and FIG. 17, after transmitting the paper for a while, the first drive gear 61 drives the pressure swing arm 431 to rotate anticlockwise, so that the pressure actuating gear 433 breaks away from the cam gear 436. The pickup drive gear 131 rotates anticlockwise to drive the pickup swing arm 132 to rotate anticlockwise, the pickup actuating gear 134 rotates to engage with the cam gear 436 so as to drive the cam gear 436 to rotate anticlockwise until the cam gear 436 rotates to the missing tooth portion 4361 facing to the pickup drive gear 131, at the moment, the cam gear 436 stops rotating. The cam 435 presses downward on the pressure transmission actuating arm 434, the pressure transmission actuating arm 434 presses downward on the pressure lever 437, the paper-out pressure roller 42 breaks away from the paper-out roller 41 for ensuring the paper which pass through the scanning channel 83 partially transmitted out of the paper-out channel 84. Then the motor 90 rotates clockwise, the first drive gear 61 drives the pressure swing arm 431 to rotate anticlockwise to make the pressure actuating gear 433 engage with the cam gear 436 to rotate anticlockwise, the cam gear 436 will bring along the cam 435 to rotate, and push the pressure transmission actuating arm 434 to be raised up so as to drive the pressure lever 437 to be raised up for making the paper-out pressure roller 42 close to the paper-out roller 41, the first drive gear 61 brings along the paper-out roller 41 to rotate clockwise so as to transmit the paper out of the paper-out channel 84 to complete the one-sided scanning. Then the paper is transmitted out of the paper-out channel 84 for a distance to the missing tooth portion 4361, then the motor 90 rotates anticlockwise, the first drive gear 61 brings along the paper-out roller 41 to rotate anticlockwise, the paper-out roller 41 makes the paper transmitted out of the paper-out channel 84 partially pulled back to the paper-out channel 84. The turn-over roller 51 and the paper-out roller 41 bring along the paper to the turn-over channel 86 to scan the other side of the paper, simultaneously, the paper-out pressure roller 42 breaks away from the paper-out roller 41 to keep an open status, so as to ensure the paper to be transmitted to the turn-over channel 86 again. At the moment, the separation roller 12 is unable to rotate by virtue of the one-way gearing, so the pickup device 10 will not start picking up the paper. When the paper touches the correcting sensor 21, the motor 90 rotates clockwise, the correction roller 22 stops rotating, the paper will be curved on account of the paper being obstructed, the correcting sensor 21 sends another information to the motor 90, the motor 90 rotates anticlockwise. The correction roller 22 and the paper-feed roller 31 brings along the paper clockwise to scan the other side of the paper, after a while, the paper-out pressure roller 42 breaks away from the paper-out roller 41, the paper is transmitted out of the paper-out channel 84.

Referring to FIG. 16 and FIG. 17, after completing the two-sided three-path scanning, it is able to repeat the steps described above and shown in FIG. 16 and FIG. 17, the paper is pulled back to the turn-over channel 86 to proceed a second turn-over rotation so as to turn over the paper to a positive side.

Referring to FIG. 2, FIG. 3, FIG. 5, FIG. 6, FIG. 12 and FIG. 18, after the second turn-over rotation to turn over the paper to the positive side, the motor 90 keeps rotating anticlockwise to transmit the paper out, until a tail edge of the paper breaks away from the scanning channel 83, the motor 90 starts rotating clockwise, the paper-feed roller 31 rotates clockwise to bring along the paper to discharge the paper from the paper-out tray 85; simultaneously, the pickup device 10 presses downward on the paper to continue feeding the paper, and the automatic document feeder 200 returns to a status (shown in FIG. 12) to start feeding the paper again.

As described above, the transmission device of automatic document feeder 100 disposed with a plurality of swing arms and cam gears 436, it utilizes different swing arms to generate a swing interaction in a condition of the drive gears rotating in different directions to transmit the transmission torque to the pickup device 10, the correction device 20, the paper-feed device 30, the paper-out device 40 and the turn-over device 50 in turn, and also utilizes a time difference between the swing arms swinging back and forth to control an output time of the transmission torque. Furthermore, it utilizes a characteristic of the cam gear 436 rotating to the missing tooth portion 4361 to stop rotating to realize a switch action of the paper-out pressure roller 42. So it only needs to use the motor 90 without being assembled with an extra controller, and it is able to effectively decrease a volume of the automatic document feeder 200 and lower a manufacturing cost of the automatic document feeder 200.

What is claimed is:

1. A transmission device of automatic document feeder adapted for being assembled in an automatic document feeder, the automatic document feeder including a pickup device, a correction device, a paper-feed device, a paper-out device, a turn-over device and a motor, the transmission device of automatic document feeder for transmitting transmission torques of the motor, the transmission device of automatic document feeder comprising:

a transmission gear assembly connected with and driven by the motor, the transmission gear assembly including a transmission roller connecting with the motor, a first drive gear and a second drive gear respectively driven by the transmission roller;

a pickup transmission gear assembly including a pickup drive gear, a pickup swing arm coaxially pivoted with the pickup drive gear, and a pickup auxiliary swing arm coaxially pivoted with the first drive gear of the transmission gear assembly, the pickup swing arm swinging between a first position and a second position with the rotation of the pickup drive gear, and the pickup auxiliary swing arm swinging between a third position and a fourth position with the rotation of the first drive gear of the transmission gear assembly, when the motor rotates clockwise to make the pickup swing arm to swing to the first position, the pickup transmission gear assembly contacting the pickup device and transmitting a first transmission torque to the pickup device, at the moment, the pickup auxiliary swing arm swinging to the fourth position, the pressure transmission gear assembly contacting the paper-out device and transmitting a second transmission torque to the paper-out device, when the motor rotates anticlockwise to make the pickup swing arm to swing to the second position, the pickup transmission gear assembly contacting the paper-out device and transmitting a third transmission torque to the paper-out device, at the moment, the pickup auxiliary swing arm swinging to the third position, the pickup transmission gear assembly contacting the pickup device and transmitting a fourth transmission torque to the pickup device;

a paper-feed transmission gear assembly driven by the transmission gear assembly, and the transmission gear assembly rotating towards different directions to drive the paper-feed device to rotate or stop rotating, the paper-feed transmission gear assembly including a paper-feed reverse gear engaging with the transmission roller of the transmission gear assembly, and a paper-feed swing arm coaxially fastened to the paper-feed reverse gear, the paper-feed swing arm swinging between a fifth position and a sixth position with the rotation of the paper-feed reverse gear of the paper-feed transmission gear assembly, when the motor rotates anticlockwise to make the paper-feed swing arm swing to the fifth position, the paper-feed transmission gear assembly engaging with the paper-feed device and transmit a fifth transmission torque to the paper-feed device, when the motor rotates clockwise to make the paper-feed swing arm swing to the sixth position, the paper-feed device rotating anticlockwise to stop feeding the paper;

a correction transmission gear assembly driven by the paper-feed transmission gear assembly, and the correction transmission gear assembly and the paper-feed transmission gear assembly rotating towards the same direction;

a pressure transmission gear assembly including a pressure swing arm coaxially fastened with the first drive gear of the transmission gear assembly, and a pressure actuating gear pivoted to the pressure swing arm, the pressure swing arm swinging between a seventh position and an eighth position with the rotation of the transmission roller of the transmission gear assembly, when the pressure swing arm swings to the seventh position, the pressure actuating gear of the pressure transmission gear assembly breaking away from the paper-out device, when the pressure swing arm swings to the eighth position, the pressure actuating gear of the pressure transmission gear assembly engaging with the paper-out device, and transmitting a sixth transmission torque to the paper-out device; and a turn-over transmission gear assembly driven by the first drive gear of the transmission gear assembly, no matter towards which direction the first drive gear of the transmission gear assembly rotates, the transmission gear assembly being able to transmit the transmission torque with the same direction to the turn-over device, wherein when the pickup swing arm swings towards the first position, the pickup auxiliary swing arm swings towards the fourth position, the paper-feed swing arm swings towards the sixth position, the pressure swing arm swings towards the eighth position, when the pickup swing arm swings towards the second position, the pickup auxiliary swing arm swings towards the third position, the paper-feed swing arm swings towards the fifth position, and the pressure swing arm swings towards the seventh position.

2. The transmission device of automatic document feeder as claimed in claim 1, wherein the second drive gear is driven by the transmission roller and transmits a driving force to the paper-feed transmission gear assembly, the transmission roller, the first drive gear and the motor rotate towards the same direction, the pickup device includes a pickup element, a separation element and a first transmitting element linking the pickup element and the separation element, the paper-feed device includes a paper-feed roller and a paper-feed pressure roller, the paper-out device includes a paper-out roller and a paper-out pressure roller, the first drive gear and the paper-out roller are coaxially assembled together, the second drive gear and the paper-feed roller are coaxially assembled together.

3. The transmission device of automatic document feeder as claimed in claim 2, wherein the pickup transmission gear assembly includes a pickup reverse gear assembly, a pickup actuating gear movably engaging with or separating from the pickup drive gear and the pickup reverse gear assembly and coaxially pivoted with the pickup swing arm by a torque limiter, a pickup auxiliary swing arm coaxially pivoted with the first drive gear, a pickup auxiliary actuating gear movably engaging with or separating from the pickup reverse gear assembly and coaxially pivoted with the pickup auxiliary swing arm by the torque limiter, and a reverse gear engaging with the first drive gear and the pickup drive gear, the pickup drive gear and the first drive gear is able to rotate towards the same direction by virtue of the reverse gear, the pickup reverse gear assembly includes a pickup reverse gear engaging with the pickup actuating gear, and a pickup reverse drive gear engaging with the pickup reverse gear and coaxially connecting with separation roller.

4. The transmission device of automatic document feeder as claimed in claim 2, wherein the correction device includes a correcting sensor, a correction roller and a correction pressure roller, the correction transmission gear assembly includes a correction transmission gear coaxially driven by the second drive gear and coaxially assembled with the paper-feed roller, a correction drive device, and a second transmitting element linking the correction transmission gear and the correction drive device, the correction drive device is driven by the correction transmission gear on account of the a second transmitting element linking the correction transmission gear and the correction drive device, and the correction drive device and the correction transmission gear rotate towards the same direction, and the correction drive device coaxially assembled with the correction roller.

5. The transmission device of automatic document feeder as claimed in claim 2, wherein the paper-feed transmission gear assembly includes a first paper-feed actuating gear movably engaging with or separating from the second drive gear and pivoted to the paper-feed swing arm by the torque limiter, a paper-feed reverse actuating gear and a second paper-feed actuating gear.

6. The transmission device of automatic document feeder as claimed in claim 2, wherein the pressure transmission gear assembly includes a pressure reverse gear pivoted to the pressure swing arm and engaging with the first drive gear, a pressure actuating gear pivoted to the pressure swing arm and engaging with the pressure reverse gear, a pressure transmission actuating arm disposed facing to the paper-out roller, a cam disposed to one side of the pressure transmission actuating arm, a cam gear coaxially pivoted with the cam and a pressure lever controlled by the pressure transmission actuating arm.

7. The transmission device of automatic document feeder as claimed in claim 6, wherein the cam gear defines a missing tooth portion, when the pickup actuating gear and the pressure actuating gear drive the cam gear to rotate, the cam gear will stop rotating at the position of the missing tooth portion.

8. The transmission device of automatic document feeder as claimed in claim 6, wherein the cam gear is coaxially disposed with a resistance spring, the resistance spring exerts a resistance on the cam gear to ensure the cam gear to stop rotating until the cam gear rotates to the position of the missing tooth portion.

9. The transmission device of automatic document feeder as claimed in claim 2, wherein the turn-over transmission gear assembly includes a turn-over transmission gear coaxially connected with the first drive gear, a turn-over drive gear engaging with the turn-over transmission gear, a turn-over swing arm coaxially pivoted with the turn-over drive gear and having two free ends, a turn-over output roller coaxially connected with the turn-over roller, a turn-over reverse gear assembly engaging with the turn-over output roller, a first turn-over actuating gear and a second turn-over actuating gear respectively pivoted to the two free ends of the turn-over swing arm by the torque limiter, the turn-over reverse gear assembly includes a first turn-over reverse gear engaging with the turn-over output roller, and a second turn-over reverse gear engaging with the first turn-over reverse gear.

10. The transmission device of automatic document feeder as claimed in claim 9, wherein the torque limiters are designated as compression springs, the compression spring is assembled to swing arm which is designated as the pickup swing arm, the pickup auxiliary swing arm, the paper-feed swing arm, the pressure swing arm or the turn-over swing arm, and make two opposite ends of the compression spring respectively abut against the swing arm and an actuating gear which is designated as a pickup actuating gear of the pickup transmission gear assembly, a pickup auxiliary actuating gear of the pickup transmission gear assembly, a first paper-feed actuating gear of the paper-feed transmission gear assembly, a second paper-feed actuating gear of the paper-feed transmission gear assembly, the pressure actuating gear, the first turn-over actuating gear or the second turn-over actuating gear.

\* \* \* \* \*